United States Patent [19]

Gurak

[11] 4,368,357
[45] Jan. 11, 1983

[54] BYPASS APPARATUS FOR USE IN SECURE COMMUNICATION SYSTEMS

[75] Inventor: Richard J. Gurak, Summit, N.J.

[73] Assignee: International Telephone and Telegraph Corporation, New York, N.Y.

[21] Appl. No.: 206,782

[22] Filed: Nov. 14, 1980

[51] Int. Cl.³ .............................................. H04M 1/70
[52] U.S. Cl. ..................................... 179/1.5 R; 455/26
[58] Field of Search ..................... 179/1.5 R; 375/2.1; 455/26-30

[56] References Cited

U.S. PATENT DOCUMENTS 4,208,544  6/1980  Burke, Jr. .......................... 178/22.17

Primary Examiner—Sal Cangialosi
Attorney, Agent, or Firm—John T. O'Halloran; Robert E. Lee, Jr.

[57] ABSTRACT

A secure communications system provides a non-secure bypass circuit, which circuit is in parallel with a scrambler or other device. The scrambler is operative during a secure mode to convert data or voice signals into scrambled signals. During a plain text mode, the bypass circuit is operative to directly transmit unscrambled data to the communications channel. The bypass circuit includes monitoring means which are operative to monitor the status of the bypass circuit during a secure mode to assure that there is no leakage of unscrambled information during the secure mode. To accomplish this, the bypass circuit operates in conjunction with analog gates, each of which receives an AC voltage indicative of the plain text signal, simultaneously with a DC status voltage, which voltage is monitored at each gate location to provide an output signal when any gate is not disabled during a secure mode. In this manner, the user is immediately informed that there is an information leakage and that secure transmissions cannot properly proceed.

10 Claims, 4 Drawing Figures

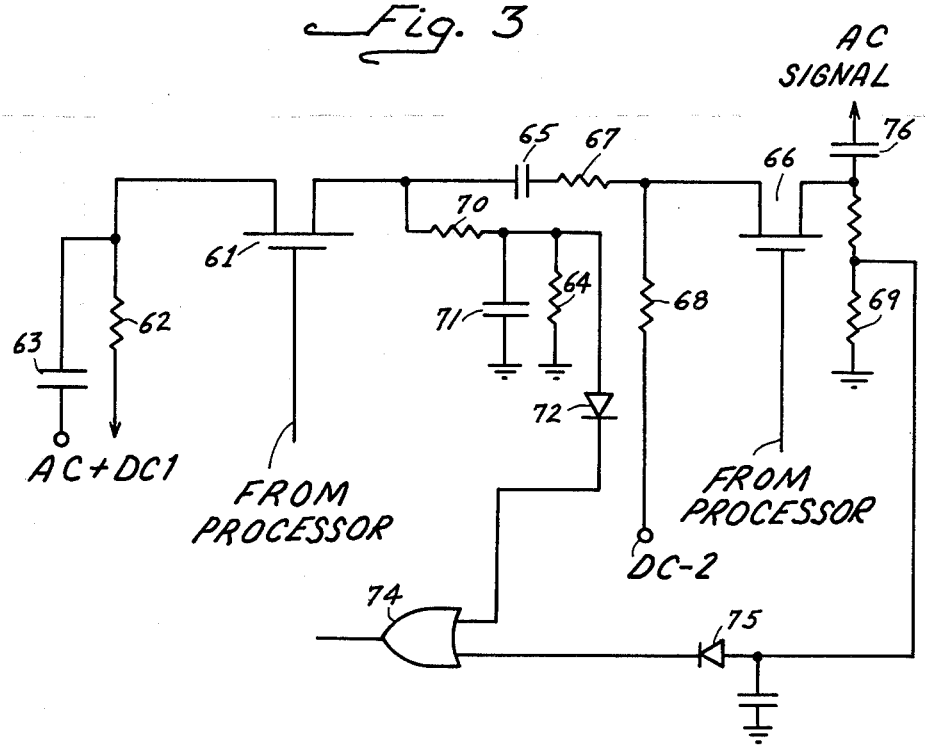
Fig. 3
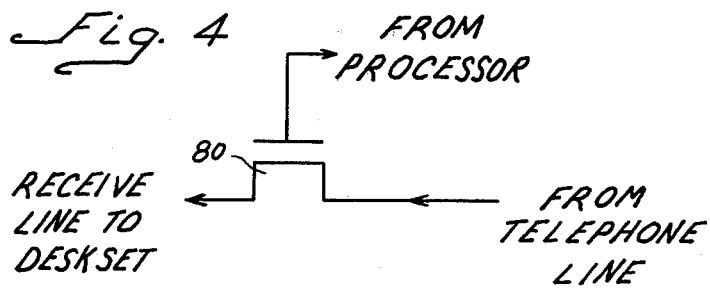
Fig. 4
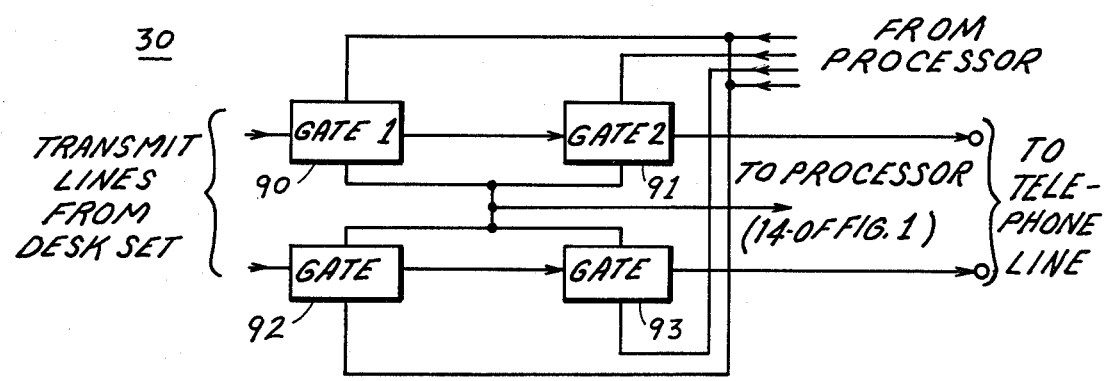

BYPASS APPARATUS FOR USE IN SECURE COMMUNICATION SYSTEMS

BACKGROUND OF THE INVENTION

This invention relates to secure or privacy telecommunication systems and more particularly to apparatus for bypassing such a system to enable a subscriber or user to communicate in a conventional manner.

Systems for communications such as telephone systems have employed scrambled data or speech to provide security and hence, to prevent unauthorized persons from listening in to highly confidential or classified information. Essentially, the function of a scrambler or a secure communication system is to render speech unintelligible by processing voice signals in a predetermined manner. Such techniques are sometimes referred to as scrambling and in order to receive a scrambled speech pattern, both parties must possess the necessary equipment to scramble and unscramble the signal according to a predetermined format.

In early systems of this type, voice frequencies were inverted or shifted and these frequencies were converted back to the original form at the receiving end by an unscrambling circuit. Accordingly, anyone having access to the scrambled speech would not understand or be able to decipher the same. Systems for scrambling and descrambling speech or other data have been widely improved and modern systems employ complicated digital techniques. In such techniques, the analog voice signal is converted to a digital signal by means of an analog to digital converter. The digital signal may be further treated by using pulse code modulation techniques to provide a scrambled signal wherein various bits of the signal are indicative of the original analog signal and are placed in a frame format or in various bit patterns according to a predetermined coding sequence. In this manner, such systems are extremely difficult to interpret and hence, even if one obtained access to the scrambled information, one would not know how to break the code.

In general, such systems are called security systems as compared to a privacy system in that due to the complexity of such systems, an interceptor must be familiar with the principles used in scrambling the voice data and must also use sophisticated equipment to discern how the data is arranged. These systems using digital procedures as above mentioned are extremely secure and are virtually impossible to break without having the exact knowledge of the coding techniques employed.

The use of digital security systems in telecommunications is extremely well known and such systems have been used, for example, in secure telephone systems to enable all subscribers to communicate with each other in a completely secure mode. As one can ascertain, such telephone systems are extremely useful in modern day society in allowing various corporate officials to communicate in a secure mode as well as a host of other uses, including military applications as well. These security techniques, when employed in conjunction with a typical telephone switching system, may employ ordinary telephone lines as furnished by the carrier and such lines may be switched through conventional telephone switching networks. Hence, it is, of course, understood that the transmission paths which are controlled by the telephone carrier may be accessible. In any event, the subscribers can still communicate in a completely secure mode due to the fact that each designated subscriber has a desk set or subset which includes a secure communications system such as a digital scrambler and descrambler to thereby enable such a subscriber to communicate with all other subscribers having duplicate equipment and to do so in a secure mode.

It becomes apparent that such subscribers may also desire to directly communicate with another subscriber in a conventional manner. Hence, in order to enable a subscriber to do so, the system must have the capability of bypassing the secure communication apparatus to enable a plain text voice path to be set up between subscribers. The term plain text refers to ordinary analog speech or ordinary data prior to scrambling. While it is extremely desirable to enable such subscribers to possess the dual capacity of secure communications and plain text communications, the system must assure that the bypassing of the secure communication or scrambling equipment is achieved in a manner to prevent information which must be secure from inadvertently leaking out and hence transmitted through the plain text bypass circuit. In this manner, while the approach to bypass a scrambling circuit may appear to be a simple matter, it is imperative that the bypass circuitry does not provide a parallel path during a secure communications mode, whereby during such a mode, the actual voice data which contains highly secured information, will not be directly transmitted to the telephone line.

It is therefore an object of this invention to provide apparatus which operates to enable the transmission and reception of plain voice text and to disable this path during a secure transmission, while assuring that no secured voice data will be transmitted through the bypass apparatus. The apparatus further provides a means of monitoring the status of the bypass circuit during a secure transmission in order to verify that the path is, in fact, disabled.

BRIEF DESCRIPTION OF THE PREFERRED EMBODIMENT

In a secure telecommunications system of the type adapted to receive clear text signals and to convert said clear text signals to a scrambled signal at an output indicative of a secure mode for applying said signal to a communications channel to thus provide secure communications between two system subscribers, the combination therewith of apparatus for providing a bypass to enable said clear text to be directly transmitted to said communications channel during a non-secure mode, while assuring that said bypass circuit is inoperative during a secure transmission, comprising selectively activated gating means adapted to receive said clear text signal at an input and having an output, means for selectively activating said gating means during a non-secure mode and for deactivating said gating means during a secure mode, means for applying a status signal to said gating means to provide at said output a composite signal of said clear text and said status signal, first means coupled to said output for passing high frequency components indicative of said clear text and for applying said signals to said communications channel during said non-secure mode, second means coupled to said output for responding to low frequency components to provide a low frequency signal indicative of said status signal, monitoring means responsive to said low frequency signal to provide an output when said gating means is activated to provide an indication of such activation, whereby a subscriber is notified during a secure mode when clear text is undesirably coupled to said transmission channel.

BRIEF DESCRIPTION OF THE DRAWINGS

Above-mentioned and other features and objects of this invention will become more apparent by reference to the following description taken in conjunction with the accompanying drawings, in which:

FIG. 3 is a simplified schematic circuit diagram of an embodiment of a gate circuit according to FIG. 2; and FIG. 4 is a simplified block diagram depicting the gate circuits associated with the bypass circuit according to this invention.

DETAILED DESCRIPTION OF INVENTION

Figure 1:
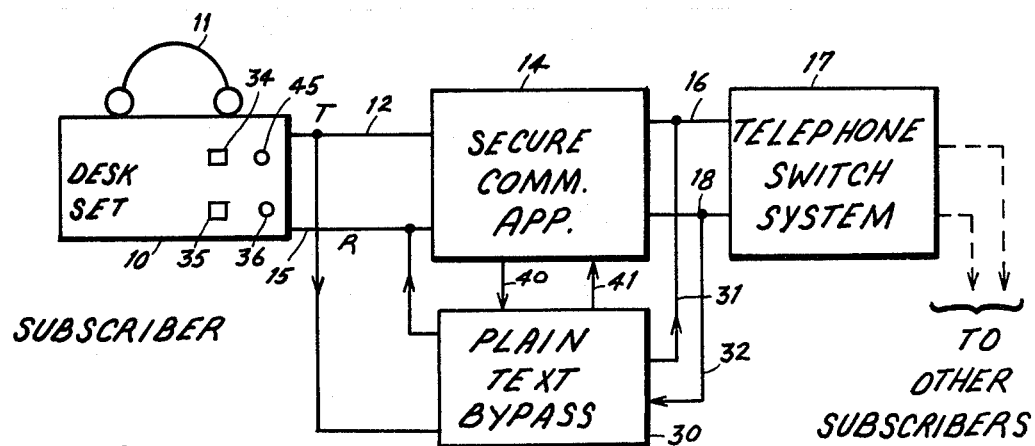
FIG. 1 is a simplified block diagram of a secure communications system employing bypass apparatus according to this invention.

Referring to FIG. 1, there is shown a simplified block diagram of a secure communications system according to this invention. Each subscriber to the system is associated with a desk set or subset 10. The subset 10 may include a conventional telephone handset 11 to enable the subscriber to receive and transmit voice signals in a well known manner.

The desk set 10 may include suitable circuitry as well as control buttons and lights to enable the user to determine desk set operation. In any event, the transmit line 12 of the desk set is coupled to a module 14 designated as secure communications apparatus. The receive line 15 to the desk set 10 also emanates from module 14.

As above indicated, the module 14 is a scrambler device. Such devices as above noted will convert analog signals on the transmit line 12 for the subscriber 10 into digital signals. These digital signals are processed by the apparatus 14 to provide output signals on output line 16, which signals have been arranged and coded according to a predetermined program or format implemented by the apparatus 14. Techniques for scrambling and unscrambling speech are well known and as indicated above, such techniques may employ digital approaches.

The transmit output line 16 is directly coupled to a telephone switching system 17 to thereby enable the subscriber 11 to contact any called party through the telephone switch operation. As above indicated, if the called party has the same secure communication apparatus 14, he will be able to unscramble the transmitted data.

As one can see from FIG. 1, received data which is sent via the telephone switching system on line 18 is also coupled to the secure communication apparatus 14 where it is descrambled according to the known program format and converted back to an analog signal, which analog signal is directed to the subset 10 via the receive line 15. In this manner, the subscriber 10 can communicate with any other subscriber in a secure mode as long as both subscribers contain the scrambling and unscrambling apparatus included in module 14.

As indicated, it is desirable for the subscriber 10 to communicate with other subscribers in a non-secure mode. For example, a subscriber may require operator assistance or may desire to communicate with another subscriber who does not have access to the secure system. In this manner, FIG. 1 shows in block diagram, a module 30 designated as plain text bypass. The module 30 has the transmit and receive lines coupled to the input side thereof and has a transmit and a receive output line 31 and 32 which are respectively coupled to the telephone line and hence, to the telephone switching system. The plain text bypass circuit 30 essentially appears as a parallel path with the secure communication apparatus 14.

In order to implement a plain text bypass mode, the subscriber 10 may depress a button 34 on his subset. This button sends a plain text mode signal to the secure communication apparatus 14. This signal may be a preselected code or tone which will be recognized by the apparatus 14 as a request for the subscriber to enter the plain text mode.

When a plain text mode is entered, a lamp 45 is lit indicating to the subscriber that he is in the plain text mode. In a similar manner, a button 35 places the subscriber in the secure mode whereby all voice communications are directed through apparatus 14. In the secure mode, a lamp 36 is lit indicating that the transmission is secure and in this mode, there should be no leakage or transmission through the plain text bypass circuit 30. If there is leakage, then as will be explained, lamp 45 will remain lit, while lamp 36 will be extinguished thereby indicating to the subscriber that he is, in fact, not in a secure mode and should not transmit further.

The apparatus 14 may include a processor or other suitable digital circuit which can send an enable signal on line 40 to the plain text bypass circuit 30. This enable signal, as will be explained, activates analog gates which are included in the plain text bypass circuit to enable connection between the input and output lines and hence, to enable direct analog communication for the subscriber 10.

The plain text bypass circuit 30 also has a signal output 41 which is sent to apparatus 14 to indicate to the processor that the plain text bypass circuit 30 is disabled during a secure mode. In order to verify that this is, in fact, true, the desk set 10 of the subscriber may include a visual indicator 45 which, in essence, is illuminated when the plain text bypass circuit 30 is not completely disabled during a secure mode.

As one can ascertain from FIG. 1, since the plain text bypass circuit is in parallel with the secure communication apparatus 14, it receives all analog speech from the desk set 10 at its inputs at all times. This includes both transmit and receive data. In this manner, if the bypass circuit 30 was not completely disabled, such secured data, before scrambling and after descrambling, would be coupled to the telephone lines 16 and 18 via the bypass circuit 30. Thus, an interceptor having access to the telephone line, would filter out all digital information and look for the low level leakage signals. By amplifying these low level analog signals, he would have complete access to the entire secure conversation. The function of the plain text bypass circuit 30 is to eliminate this and hence, to enable a user to be tied directly to the telephone lines via the bypass circuit 30 when a nonsecure mode is desired. In this manner, clear text voice inputs to the bypass circuit 30 are permitted to pass due to the action of analog gates which are included in module 30.

As will be explained, the transmit path contains four series connected analog gates which provide an open circuit isolation for the transmit lines in excess of 150 db. The receive path contains one analog gate that provides 60 db of isolation. All gates included in the bypass circuit 30 are under control of the secure communications apparatus 14, as above described. In addition to passing the clear text voice, the transmit path gates also pass locally generated DC voltages. These DC voltages are used to ascertain the status of the transmit plain text path. The status of this path is coupled to the user's desk set 10 by activating the visual indication 45. As will be explained, the bypass circuit requires that a DC status voltage is transmitted through the same exact path as the analog voice signal. This DC voltage is monitored to provide a true status of the path and hence, to avoid any leakage of secure data through the bypass path.

Figure 2:
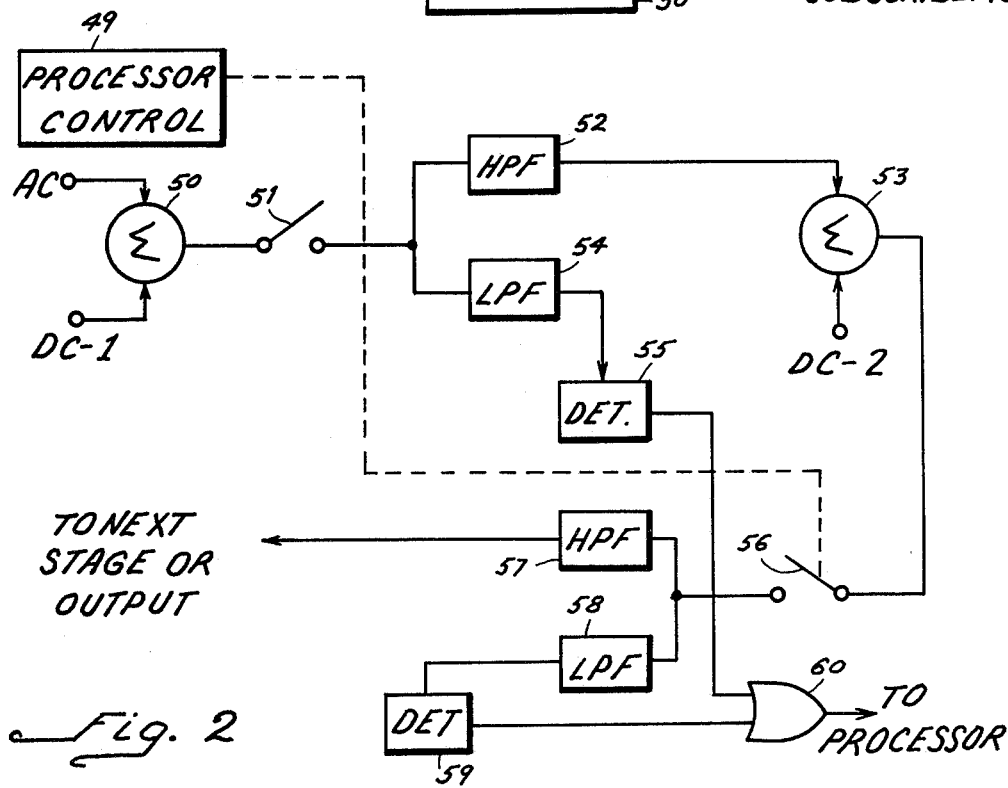
FIG. 2 is a representative block diagram of an analog gate configuration according to this invention.

Referring to FIG. 2, there is shown a schematic diagram of a single transmission gate according to this invention. Two gate configurations as shown in FIG. 2 are coupled in series in the transmit path.

Shown in FIG. 2 is a first analog summer 50 having an output coupled through a switch 51. One input to the summer 50 has an AC signal which is a clear text voice signal which is capacitively coupled to the summer. Another input to the summer is a DC voltage designated as DC-1. The analog summer thus provides at its output, a composite signal which contains the transmitted voice signal and a DC control signal DC-1. The switch 51, which may be a semiconductor switch such as a field effect transistor (FET) and so on, is enabled by a processor control circuit 49 which is contained in the secure communication apparatus 14. As above described, the subscriber, when desiring to enter a plain text mode, activates the request via button 34 on the subset 10. This action can trigger a flip/flop or other device in apparatus 14, which operation will enable switch 51.

The composite signal emanating from switch 51 is coupled to a first path including a high pass filter 52 (HPF). The high pass filter 52 is capacitively coupled to one input of a second analog summer 53. The analog summer 53 receives a second different DC voltage (DC-2) at its other input terminal. Another signal path from switch 51 is directed through a low pass filter (LPF) 54 having an output coupled to a DC detector circuit 55.

Thus, the output of the analog gate, including summer 50 and switch 51, is applied to a first path through HPF 52 and a second path through LPF 54. In a similar manner, the output of the summer 53 is applied via switch 56 to the input of a high pass filter 57 and to a low pass filter 58. The output of low pass filter 58 is also coupled to a detector 59. The outputs of both detectors 55 and 59 are coupled to the inputs of an OR gate 60, which output designates the status of the plain text bypass circuit. Hence, the OR gate 60 will provide an output when either or both of the analog gate pairs are enabled. In this manner, during a secure mode, if one of the gate pairs as 50 and 51 or 53 and 56 are enabled, the OR gate 60 will provide an output indicating that this has occurred. Hence, during a secure mode, if an output is provided by OR gate 60, the subscriber will be notified by the activation of the lamp 45 or deactivation of lamp 36 which will then indicate that a secure mode is not provided due to a leakage path in the bypass circuit.

Thus, as seen from FIG. 2, the output of the first gate when switch 51 is enabled, consists of the input DC and analog voltages that are respectively low pass filtered and applied to a detector circuit 55 and a high pass signal which is the AC signal which is capacitively coupled to gate 53. The output of gate 53, when switch 56 is enabled, consists of the input analog signal plus the second DC voltage that is again directed through a low pass filter 58 and detected via detector 55. The analog signal via the high pass filter 57 is stripped of the DC components and the output of the high pass filter 57 is directed to another gate stage and hence, serves as the AC input to another summer as summer 50 or may be connected directly to the transmit side of the telephone line. The OR gate 60 determines the status of the gate configuration depicted during a secure mode and will provide an output when either or both of the analog gate pairs is improperly enabled during a secure mode.

FIG. 2, as above described, is a representative simplified block diagram of the operation of an analog gate according to this invention, which gate employed two separate analog summers 50 and 53, each in series with a switch 51 and 56 activated by the processor. In any event, FIG. 3 shows a simplified schematic of an actual circuit configuration employed. A first field effect transistor 61 is depicted. The FET 61 may be an MOS device (metal-oxide-semiconductor), which devices have extremely large input impedances and which devices basically behave as an ideal switch.

The drain electrode of the MOS device is shown coupled via a resistor 62 to the first DC pilot source (DC-1), while the voice signal designated as AC from the telephone subset is directed through a capacitor 63 to the drain electrode. The source electrode of FET 61 is returned to ground through a suitable resistor 64. The gate electrode is connected to the actuation signal from the processor as contained in the apparatus 14 and when a positive bias is applied to the gate electrode 61, there is provided a low impedance path between the drain and the source electrode.

Essentially, the high pass filter is implemented by means of capacitor 65, which AC couples the voice signal to the drain electrode of a second FET transistor 66 via resistor 67. The gate electrode of FET 66 is also coupled to the enable signal from the processor. The second DC pilot source (DC-2) is applied to the drain electrode of FET 66 via resistor 68, while the source electrode of transistor 66 is also returned to ground through a resistor 69.

The low frequency path emanates from the source electrode of FET 61 and is directed into a simple RC low pass filter configuration comprising resistor 70 and capacitor 71. This filter is coupled via a detector 72 and coupled to one input of an OR gate 74. The other input of the OR gate 74 is derived directly from the source electrode of FET 66 via the low pass filter and detector arrangement 75. The output of the detector 75, as indicated, is applied to the input of the OR gate 74. The output AC signal emanating from FET 66 is again AC coupled via capacitor 76. This output signal may then be employed and directed to the input of a second gate structure similar to the one depicted above in order to provide greater attenuation for the bypass circuit when the subset is operated in a secure mode. For a dual gate configuration, the outputs of OR gate 74 are tied together or the gate 74 may have two additional inputs to thus monitor the status of two additional FETs serving the exact functions as 61 and 66 depicted above.

Thus, in employing conventional FET devices, one can achieve an attenuation of at least 75 db per gate when the FET 61 and FET 66 are disabled. If two gates are employed in series, the attenuation would be greater than 150 db.

Referring to FIG. 4, there is shown a receive and a transmit configuration for the transmit and receive lines directed into the plain text bypass circuit 30 of FIG. 1.

In the receive path, there is inserted one simple gate configuration comprising one FET transistor 80 having its drain and source electrodes connected in series with the receive line and having its gate electrode connected to the processor enable signal. This configuration may include a simple amplifier circuit as well.

It is understood that when in the secure mode, transistor 80 is not enabled, but the leakage requirements in the receive path are not stringent due to the fact that receive signals are coupled directly from the secure communication apparatus 14 and hence, the receive lines do not require the same amount of attenuation as required in the transmit lines. It is further understood that if a failure occurs in the transmit lines of the called party, then he will detect the failure and prevent further transmissions, thus further assuring that the calling party does not receive such information due to a transmission failure.

The transmit lines may employ two gates as the gates depicted in FIGS. 2 and 3 in series with each transmission line or in the case of an unbalanced line, two gates as gates 90 and 91 in series. In the case of balanced lines, gates 92 and 93 would be employed as well. In this manner, during a secure mode, if any gate as 90-93 is not disabled, the respective OR gate associated with each pair would indicate a binary one during a secure transmission. This signal is directed to the processor which again would trigger a flip/flop or a latch and hence, illuminate light 45 or extinguish light 36 associated with the subset. This can be done in a number of ways which are well known to those skilled in the art.

In essence, the output of the OR gate associated with each gate as 90-93 can be emplaced into the data stream which emanates from the apparatus 14 to the subset to produce a digital signal in time coincidence and of a unique format. This signal is detected by conventional circuitry in the subset to cause the subset to light plain text lamp 45 and to, for example, extinguish the secure lamp 36. This immediately tells the subscriber that he is not in a secure mode. If all gates as 90-93 are, in fact, disabled, then lamp 45 will be extinguished and lamp 36 will remain lit thus indicating to the subscriber that he is, in fact, in a secure mode and can proceed with transmission.

It is indicated that based on the above noted structure, that the redundancy in employing identical gate configurations for each complete analog gate specifies circuit component redundancy and in this manner, there is no single failure which could cause a false operation without providing an indication to the subscriber that a proper secure mode is, in fact, not implemented.

It is, of course, understood that the implementation of the general circuit configuration depicted in FIG. 2 can be done in a wide variety of ways apart from that shown in FIG. 3 and hence, one may employ other devices apart from the FETs such as analog summers in series with read relay switches, transistor circuits and so on.

The main feature of this invention is that a DC status voltage is provided, which voltage takes exactly the same path through the analog gates as does the clear text voice signals. This therefore provides a true status of the path, which status is monitored. Hence, the transmit path gates are separated into gate pairs together with their own DC status voltages for redundant fail-safe operation.

As is understood from the above description, the DC status voltages as DC-1 and DC-2 may be provided from the same power supply, but are, in fact, derived from distinct points to thus further assure fail-safe and redundant operation.

The circuit thus depicted provides a necessary circuit feature in a secure telecommunications system having the ability to bypass a scrambler or a secure communications apparatus as 14 when a clear text path is necessary to provide direct communications between subscribers. According to this invention, this path is monitored by the use of separate pilot signals which are monitored to determine that the bypass circuit is not operative during a secure transmission mode.

I claim:

1. In a secure telecommunications system of the type adapted to receive clear text signals and to convert said clear text signals to a scrambled signal at an output indicative of a secure mode for applying said signal to a communications channel to thus provide secure communications between two system subscribers, the combination therewith of apparatus for providing a bypass to enable said clear text to be directly transmitted to said communications channel during a non-secure mode while assuring that said bypass circuit is inoperative during a secure transmission, comprising:

selectively activated gating means adapted to receive said clear text signals at an input and having an output;

means for selectively activating said gating means during a non-secure mode, and for deactivating said gating means during a secure mode, means for applying a status signal to said gating means to provide at said output a composite signal of said clear text and said status signal, said composite signal having high frequency components and low frequency components;

first means coupled to said output for passing high frequency components indicative of said clear text and for applying said signals to said communications channel during said non-secure mode;

second means coupled to said output for responding to low frequency components to provide a low frequency signal, indicative of said status signal;

monitoring means responsive to said low frequency signal to provide an output when said gating means is activated to provide an indication of such activation, whereby a subscriber is notified during a secure mode when clear text is undesirably coupled to said transmission channel.

2. The secure telecommunications system according to claim 1, wherein:

said clear text signal is a voice analog signal for application to a scrambler circuit prior to transmission of the same over a telephone line.

3. The secure telecommunications system according to claim 2, wherein:

said gating means has a first input to which said voice signal is capacitively coupled and a second input for receiving a DC status signal to provide at an output a composite signal comprising said voice signal and said DC status signal.

4. The secure telecommunications system according to claim 3, wherein:

said means for selectively activating said gate includes switching means capable of being activated by said subscriber to access said non-secure mode.

5. The secure telecommunications system according to claim 1, wherein:

said gating means includes a semiconductor device having a first input electrode capacitively coupled to said clear text signals and for receiving a DC status signal, an output electrode for providing said composite signal and a control electrode for selectively activating said device to provide a low impedance path between said input and output electrodes when said control electrode is activated.

6. The telecommunications system according to claim 5, wherein:
said semiconductor device is a field effect transistor having a drain input electrode, a source output electrode and a gate control electrode.

7. The secure telecommunications system according to claim 1, wherein:
said gating means comprises a first selectively activated gating means having an input for receiving said clear text signals and a second input for receiving a first status signal for providing at an output a composite signal, with a first high pass filter means coupled to said output for passing said clear text signals and a first low pass filter means coupled to said output for responding to said first status signal to provide a first output monitor signal, a second selectively activated gating means having an input responsive to said clear text signals as passed by said first high pass filter means and for receiving a second status signal different than said first to provide at an output a second composite signal, with a second high pass filter means coupled to said output of said second gate for passing said clear text signals and a second low pass filter means for responding to said second status signal to provide a second output monitor signal.

8. The secure telecommunications system according to claim 7, wherein:
said monitoring means includes an OR gate means adapted to receive at an input said first and second monitor signals to provide at an output an indication when either of said first or second analog gates are operative.

9. The secure telecommunications system according to claim 2, wherein:
said clear text signals emanate from a subscriber telephone subset having transmit and receive lines coupled to a scrambler circuit with the output of said scrambler circuit coupled to the receive and transmit paths of a telephone line, with said apparatus for providing a bypass in shunt between said subset and said telephone lines and having said selectively activated gating means coupled in series with said transmit lines as directed to said bypass apparatus from said subset.

10. The secure communications systems according to claim 1, wherein:
said monitoring means further includes indicator means operative to provide a visual indication to said subscriber.

* * * * *